United States Patent [19]
Sexton

[11] Patent Number: 5,314,512
[45] Date of Patent: May 24, 1994

[54] ABRASIVE TOOL

[76] Inventor: John S. Sexton, Bobcat, West Street, Odiham, Hampshire, United Kingdom

[21] Appl. No.: 105,103

[22] Filed: Aug. 10, 1993

Related U.S. Application Data

[63] Continuation of Ser. No. 762,422, Sep. 19, 1991, abandoned.

[30] Foreign Application Priority Data

Sep. 19, 1990 [GB] United Kingdom ............... 9020462

[51] Int. Cl.⁵ .............................................. B24D 3/00
[52] U.S. Cl. ...................................... 51/293; 51/298; 51/307; 264/238; 425/542
[58] Field of Search .................. 51/293, 298, 307; 264/238; 425/542

[56] References Cited

U.S. PATENT DOCUMENTS

| | | | |
|---|---|---|---|
| 3,383,191 | 5/1968 | Thomas | 51/298 |
| 3,615,302 | 10/1971 | Rowse | 51/298 |
| 3,795,078 | 3/1974 | Coes, Jr. | 51/206.5 |
| 3,800,483 | 4/1974 | Sherman | 51/298 |
| 4,054,425 | 10/1977 | Sherman | 51/293 |
| 4,088,729 | 5/1978 | Sherman | 51/298 |
| 4,369,046 | 1/1983 | Bruschek et al. | 51/309 |
| 4,787,362 | 11/1988 | Boucher | 125/15 |
| 4,927,432 | 5/1990 | Budinger et al. | 51/298 |
| 5,131,924 | 7/1992 | Wiand | 51/293 |

FOREIGN PATENT DOCUMENTS

| | | |
|---|---|---|
| 88/09251 | 12/1988 | Fed. Rep. of Germany . |
| 2428510 | 1/1990 | France . |
| 0167770 | 8/1985 | Japan .................. 125/15 |

OTHER PUBLICATIONS

Patent Abstract of Japan vol. 8, No. 203 (M-326)(1640) Sep. 18, 1984 & JP,A, 59 093 264 (Toukiyou Diamond Kougu Seisakusho K.K.) May 29, 1984.

Primary Examiner—Mark L. Bell
Assistant Examiner—Willie J. Thompson
Attorney, Agent, or Firm—Scully, Scott, Murphy & Presser

[57] ABSTRACT

An abrasive tool such as a grinding wheel or a saw is characterized by the working portion comprising a mass of ultra-hard abrasive particles dispersed in a non-porous thermoplastic polymer matrix. Examples of suitable thermoplastic polymers are polyetheretherketone, polyaryletherketone, poly (amide-imide), polyphenylene sulphide, liquid crystal polymer and mixtures thereof.

8 Claims, 3 Drawing Sheets

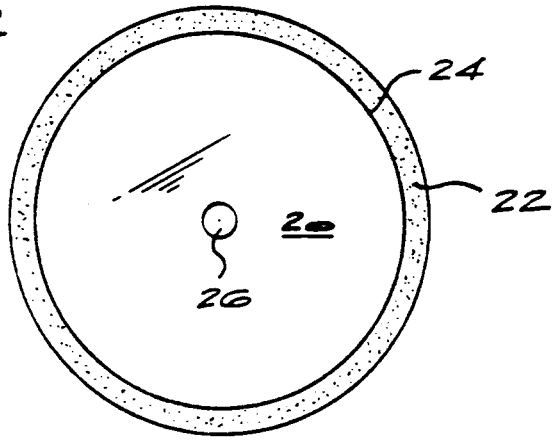
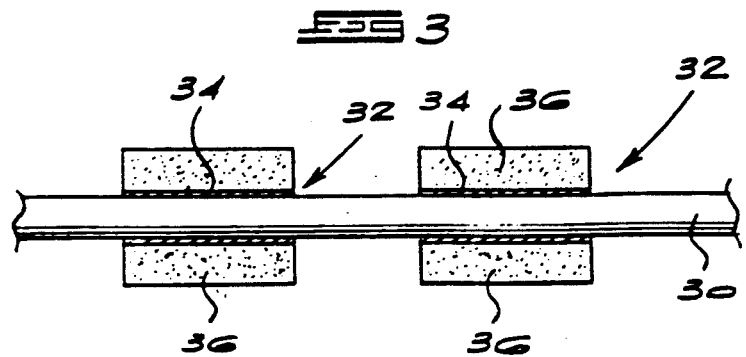
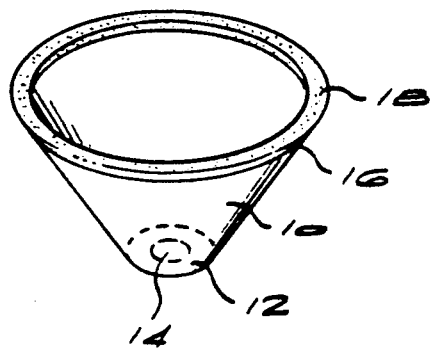

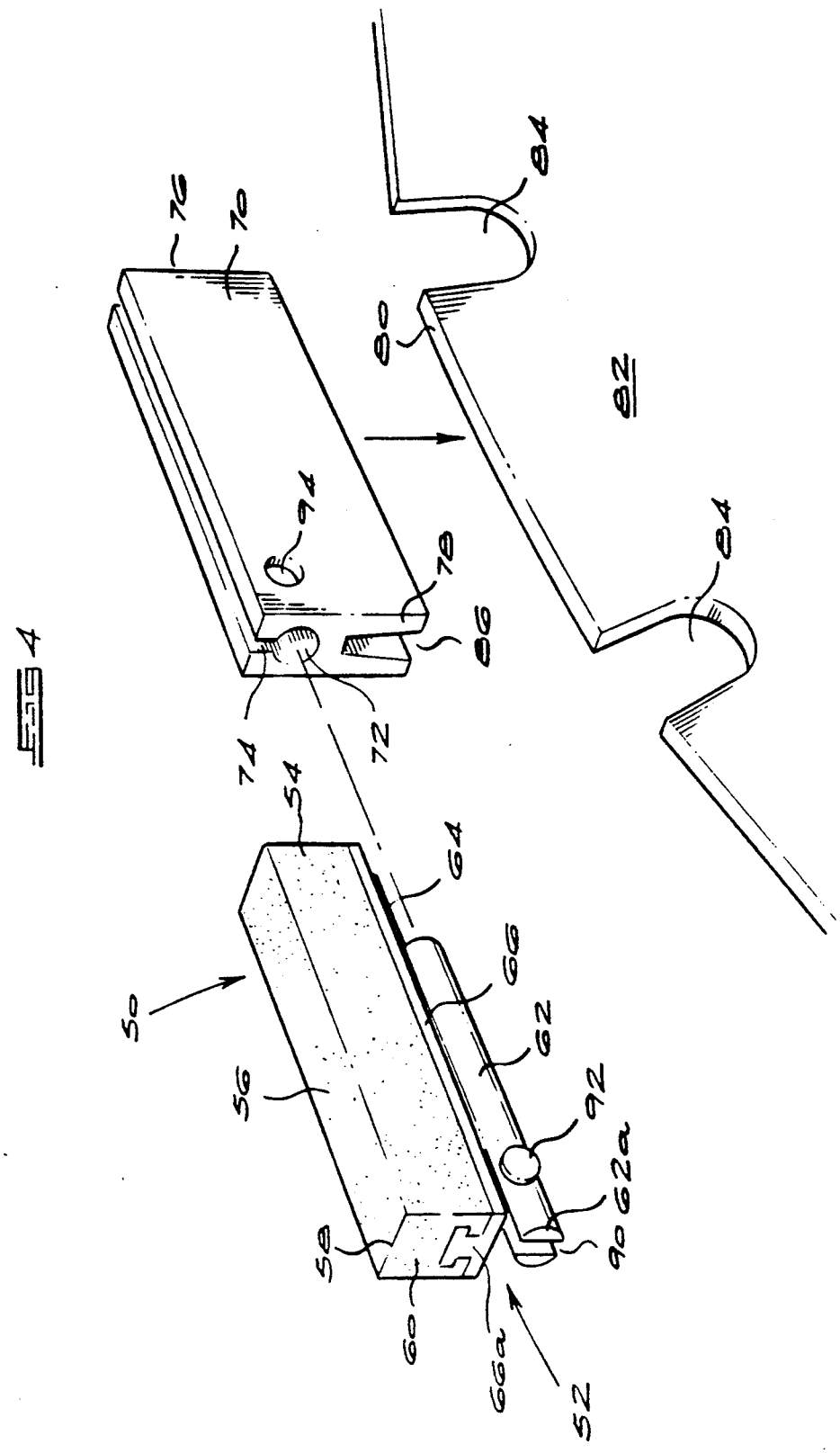

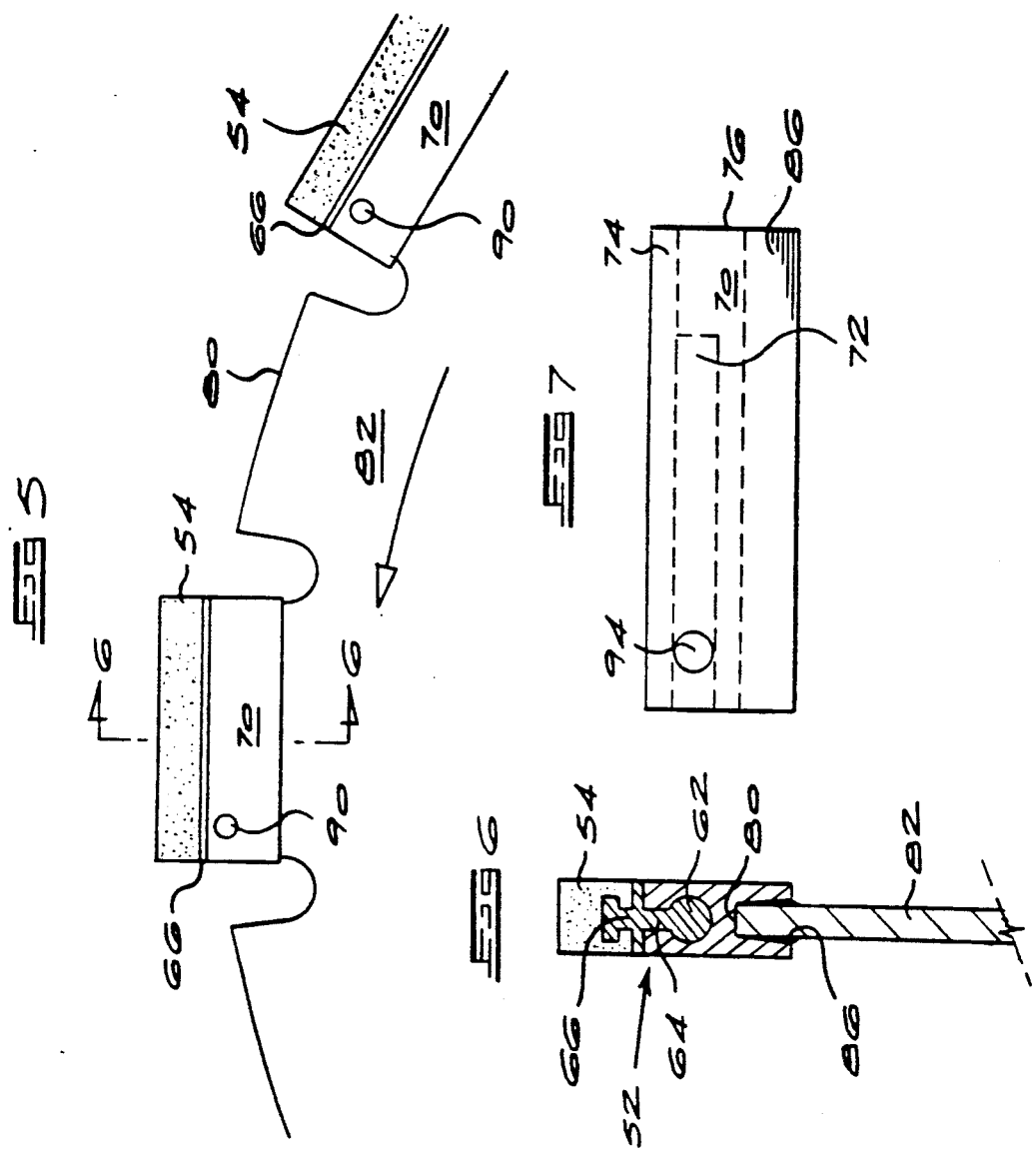

ABRASIVE TOOL

This is a continuation of copending application Ser. No. 762,422 filed on Sep. 19, 1991 now abandoned.

BACKGROUND OF THE INVENTION

This invention relates to abrasive tools.

There are a variety of abrasive tools available which use ultra-hard abrasives such as diamond and cubic boron nitride (CBN) as the abrasive. Such tools include grinding wheels and saws.

Grinding wheels comprise a hub, typically made of a material such as bakelite, phenol-aluminium or aluminium, and a working rim secured to the periphery of the hub. The working portion will typically comprise a mass of ultra-hard abrasive particles dispersed in a metal matrix, vitreous matrix or in a thermosetting resin such as a phenol formaldehyde, urea formaldehyde or melamine formaldehyde resin. The hub may take the form of a flat disc or a cup.

One type of known saw comprises a flat circular blank or disc having a working portion bonded to the periphery thereof. The working portion may comprise a plurality of individual segments or a continuous rim. The working portion comprises a mass of ultra-hard abrasive particles dispersed in a metal bonding matrix. An example of a suitable metal bonding matrix is cobalt/bronze.

Another type of saw is a wire saw which comprises a wire having a plurality of annular segments bonded or secured to the wire in spaced relationship.

The manufacture of grinding wheels using thermosetting resins is ponderous and slow, the materials have poor heat conductivity and it may be necessary to heat a powder mix of such a material for four hours or more in an oven to set it.

In the literature there are described polishing materials comprising a flexible or similar support having a layer of abrasive particles in a binder resin bonded to a surface thereof. One such polishing material is described in U.S. Pat. No. 4,927,432. This polishing pad material comprises a porous thermoplastic resin matrix reinforced with a fibrous network and optionally containing abrasive particles such as silicon carbide, cerium oxide, titanium dioxide or diamond. The material is used for polishing silicon wafers by chemical attack, the pores being necessary to accommodate the liquid chemical reagent. The porous nature of the thermoplastic resin matrix renders the pad unsuitable for grinding and sawing operations where abrasion and not chemical attack of a workpiece occurs.

SUMMARY OF THE INVENTION

According to the present invention, an abrasive tool comprises a support and a working portion secured to the support, the working portion comprising a mass of ultra-hard abrasive particles dispersed in a non-porous thermoplastic polymer matrix, the abrasive particle content of the working portion being at least 4 volume percent.

Further according to the invention, a segment for use in manufacturing the working portion of a tool as described above comprises a mass of ultra-hard abrasive particles dispersed in a non-porous thermoplastic polymer matrix, the abrasive particle content being at least 4 volume percent.

DESCRIPTION OF THE DRAWINGS

FIG. 1 illustrates a perspective view of a typical cup grinding wheel;

FIG. 2 illustrates a side view of a typical disc or peripheral grinding wheel;

FIG. 3 illustrates a sectional side view of a typical wire saw;

FIG. 4 shows an exploded perspective view of an abrasive segment according to the invention and a saw blade disc;

FIG. 5 shows a side view of the saw blade disc having a plurality of abrasive segments of FIG. 4 secured thereto;

FIG. 6 is a section on line 6—6 of FIG. 5; and

FIG. 7 shows a side view of an insert retainer to receive a moulded insert shown in FIG. 4.

DESCRIPTION OF EMBODIMENTS

The abrasive tool of the invention may be a saw or a grinding wheel.

An example of a cup grinding wheel is illustrated by FIG. 1. Referring to this figure, the grinding wheel comprises a flared cup hub 10 having a base 12 with a hole 14 formed therein. The grinding wheel is mounted on a suitable shaft for rotation by means of the hole 14. Bonded to the periphery 16 of the hub is a working portion or rim 18.

An example of a peripheral grinding wheel is illustrated by FIG. 2. Referring to this figure, the grinding wheel comprises a disc-shaped hub 20 having a rim 22 bonded to the periphery 24 of the hub. The hub has a centrally located hole 26 for mounting the wheel on a suitable shaft.

An example of a saw is one wherein the support is a circular blank and the working portion comprises a plurality of segments secured to the periphery of the blank or a continuous rim which is secured to the periphery of the blank.

A wire saw is one wherein the support is a wire and the working portion comprises a plurality of annular segments secured in spaced relationship with the wire. The wire will typically be made of a metal or a tough polymer such as Kevlar®. An example of a typical wire saw is illustrated by FIG. 3 of the accompanying drawings. Referring to this figure, the wire saw comprises a wire 30 having a plurality of cutting elements 32 secured to the wire in spaced relationship. Each cutting element 32 comprises an annular sleeve 34 which is secured to the wire and an annular working portion or segment 36 secured to the sleeve 34. Spacers (not shown) may be provided between adjacent cutting elements 32.

The ultra-hard abrasive particles used in the invention may be single crystal or polycrystalline diamond, or single crystal or polycrystalline CBN. Polycrystalline diamond or CBN may be produced by crushing a diamond or cubic boron nitride abrasive compact. Such compacts are well known in the art.

The ultra-hard abrasive particles will be dispersed in the polymer matrix. Generally these particles will be uniformly dispersed in the polymer matrix, at least in the region of the working portion which, in use, does the abrading.

The ultra-hard abrasive particles may be provided with a suitable metal coating to improve the retention of the particles in the thermoplastic matrix. For grinding wheels, the coating will typically be a coating such as nickel or copper. For saws, the coating will typically be a metal such as titanium.

The thermoplastic polymer is preferably selected from one of the following polymers: Polyetheretherketone (PEEK) and polyetherketone (PEK) such as that marketed by ICI under the trade name VICTREX ®. Polyaryletherketone such as that marketed by BASF under the trade name ULTRAPEK ®. Poly (amide-imide) such as that marketed by Amoco under the trade name TORLON ®. Polyphenylene sulphide (PPS) such as that marketed by Phillips under the trade name RYTON ®. Liquid Crystal Polymer (LCP) such as that marketed by Hoechst under the trade name VECTRA ®.

Two, or more polymers may be used simultaneously in the polymer matrix in order to use the beneficial characteristics of each polymer. For instance, liquid crystal polymer (LCP) may be used in conjunction with polyetheretherketone (PEEK) in order that the low melt viscosity of the LCP may assist in the free flowing characteristics of the relatively highly viscous PEEK. This will be particularly important where there are high levels of fillers used in the matrix which make the matrix very viscous and difficult to process in conventional moulding equipment.

Other materials may be added to the polymer matrix to improve the properties of the working portion of the tool or segment of the invention. For example, carbon fibres or particles may be added to give strength, bronze powder added to improve thermal conductivity, silica powder added for abrasion resistance, alumina added for wear resistance or PTFE or silicon added to improve lubricity.

The thermoplastic polymer may be a so-called "filled" polymer. Such polymers will contain a particulate or fibre filler in an amount of up to 40 percent by volume. Examples of suitable particulate fillers are silicon carbide, alumina, glass and graphite. Examples of suitable fibres are graphite fibres, steel fibres and PTFE fibres.

In the case of saws, the abrasive particle content of the working portion is preferably in the range 4 to 20 volume percent. In the case of grinding wheels, the abrasive particle content is preferably in the range 15 to 30 volume percent.

The ultra-hard abrasive particles will typically have a size in the range 1 to 1000 microns. For saws, these particles will preferably have a size in the range 100 to 1000 microns. For grinding wheels, these particles will preferably have a size in the range 1 to 500 microns.

The working portion, as mentioned above, may comprise a plurality of segments, or a continuous rim. In the case of the continuous rim, it may be produced as an integral single entity or it can be formed by producing a plurality of segments which are then bonded together to form a rim.

The segments will typically be made by injection moulding, compression moulding or powder spraying. Injection moulding requires that the polymer matrix, including the ultra-hard abrasive and fillers, be heated in the barrel of an injection moulding machine and injected into a purpose built mould. Typical moulding machine barrel temperatures would range from 280° C. to 400° C.; typical injection pressures would range from 70 MPa to 150 MPa; holding pressures of 35 MPa to 70 MPa over a period of 2 seconds to 10 seconds may be used. It is preferred that the mould is heated to typical temperatures of between 150° C. and 200° C.

Compression moulding requires the polymer matrix to be loaded as a mixture together with the fillers and ultra-hard abrasive, into a purpose built mould. The mixture should then be pressurised to typically 1 MPa to expel air. The mould should then be heated to typically 280° C. to 400° C. for up to 2 hours. At the end of this period, the mixture should then be pressure cycled thus: 1 minute at 3,5 MPa, 1 minute at 7,0 MPa and finally 10 minutes at 14 MPa. The final pressure should be held whilst cooling takes place, over a period of typically 10 minutes.

Spraying may be carried out by conventional electrostatic spraying techniques. The polymer matrix, together with the fillers and ultra-hard abrasive may be sprayed directly onto a surface. The surface should be typically heated to 400° C. to 450° C. After coating, the surface should be re-heated for typically 2 minutes in an oven to improve the "flow-out" of the polymer. Typically, coatings up to 2 mm may be applied by a series of sprayings.

An example of an abrasive segment of the invention and the manner in which it may be secured to a saw blank is illustrated diagrammatically by FIGS. 4 to 7 of the accompanying drawings. Referring to these drawings, an injection moulded insert 50 comprises a base portion 52 and a cutting portion 54. The cutting portion 54 has a top cutting surface 56, a leading cutting edge 58 and a front surface 60. The base portion 52 comprises a generally cylindrical spine 62, a connecting web 64 and a cutting portion supporting section 66. The section 66 has a leading surface 66a and the spine 62 has a leading surface 62a, both of which are flush with the surface 60.

The cutting element 50 is received by retainer 70 which has a bore 72 for receiving the spine 62 and a slot 74 for receiving the web 64. The slot 74 extends the full length of the retainer 70, while the slot 72 stops short of the end 76 of the retainer. This can be seen clearly from FIG. 7. The insert 50 is engaged with the retainer so that the front surfaces 60, 62a and 66a of the insert are flush with the front surface 78 of the retainer.

The retainer 70 may be formed of a material such as stainless steel which can be secured by welding or brazing to the peripheral edge 80 of a circular saw blade disc 82 used as a circular saw. The edge 80 has spaced recesses 84 formed therein for accommodating cooling fluid, in use. The edge 80 of the disc is accommodated in the slot 86 formed in the retainer 70.

The inserts 50 are preferably formed of PEEK ® and moulded in two sections or portions, as illustrated. The base portion 52 will be of the base polymer itself, with whatever additional fillers may be required but without ultra-hard abrasive, while the cutting portion 54 will be moulded on to the base section and will contain ultra-hard abrasive dispersed in the polymer. It is possible to make the entire insert 50 of the same ultra-hard abrasive containing polymer, but this will then lead to sections of the insert which will contain expensive ultra-hard abrasive, but will effect no abrasive action.

In use, it will be the surfaces 56 and 60 and edge 58 of the cutting portion 54 which will effect a cutting action on a hard material such as granite.

In order to restrain the insert 50 from movement out of the retainer 70, the spine 62 is provided with an inwardly directed slot 90 and an outwardly extending stop formation 92. As the insert is slid into the retainer, the end of the spine 62 may be depressed inwards in the region of the slot 90 until the stop formation 92 engages the hole 94 in the retainer 70. Removal of the inserts can be achieved by depressing inwards the spine 62 in the region of the slot 90 thereby releasing the locking effect of the stop formation 92.

Thus, it will be seen that the effective life of a saw blade can be extended by providing it with removable inserts of abrasive segments which can be replaced very much more easily and cheaply than replacing a complete saw blade.

I claim:

1. A method for preparing an injection molded saw segment comprises the steps of:
   (a) heating a mass of ultra-hard abrasive particles dispersed in a non-porous thermoplastic polymer matrix in the barrel of an injection molding machine at a temperature of from about 280° to 400° C., wherein the abrasive content of the segment is at least 4 volume percent;
   (b) injecting said heated product of step (a) into a mold at a pressure of from about 70 MPa to 150 MPa; and
   (c) maintaining said injected product of step (b) in said mold at a pressure of about 35 MPa to about 75 MPa for a period of from about 2 to about 10 seconds.

2. The method of claim 1 wherein the heating step (a) is conducted at a temperature of from about 150° to 200° C.

3. The method of claim 1 wherein the thermoplastic polymer contains a particulate or fiber filler in an amount of up to 40 percent by volume.

4. The method of claim 1 wherein the ultra-hard abrasive particles have a size ranging from 50 to 900 microns.

5. The method of claim 1 wherein the concentration of the abrasive particles content of the segment is in the range of from 4 to 20 volume percent.

6. The method of claim 1 wherein the concentration of the abrasive particles content of the segment is from 15 to 30 volume percent.

7. The method of claim 1 wherein the abrasive particles are selected from single crystal diamond, single crystal CBN, polycrystalline diamond and polycrystalline CBN.

8. The method of claim 1 wherein the thermoplastic polymer is selected from polyetheretherketone; polyetherketone, polyaryletherketone, poly(amide-imide), polyphenylene sulphide, LCP polymers and mixtures thereof.

* * * * *